Jan. 12, 1943.   R. H. HAINKE   2,308,076
LAWN MOWER
Filed July 15, 1940
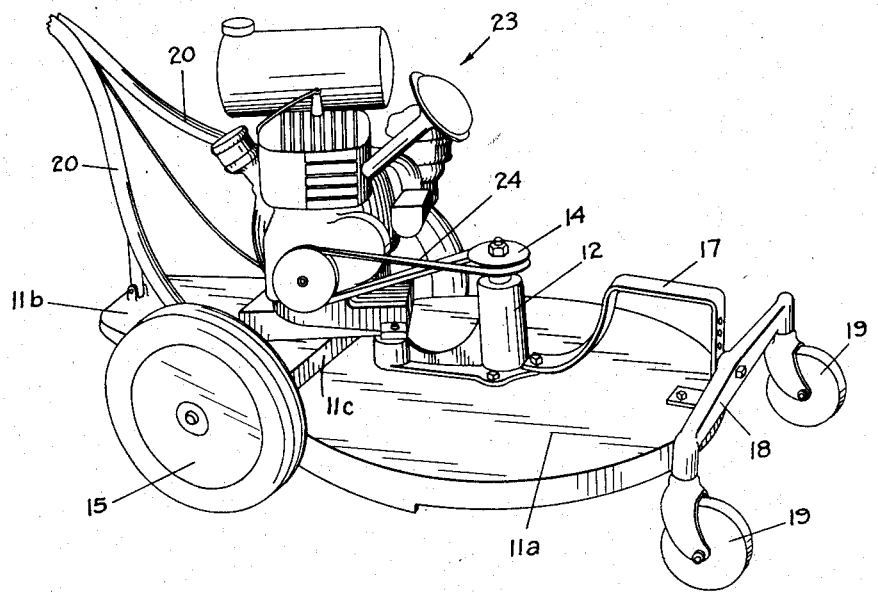
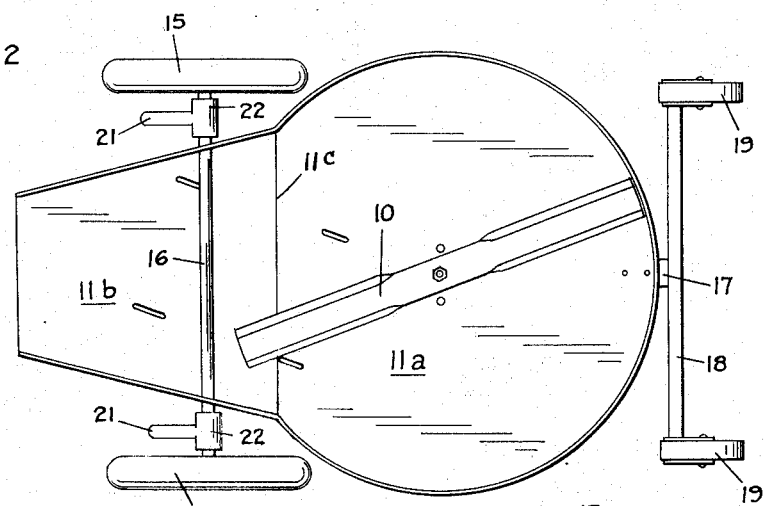
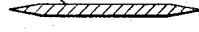
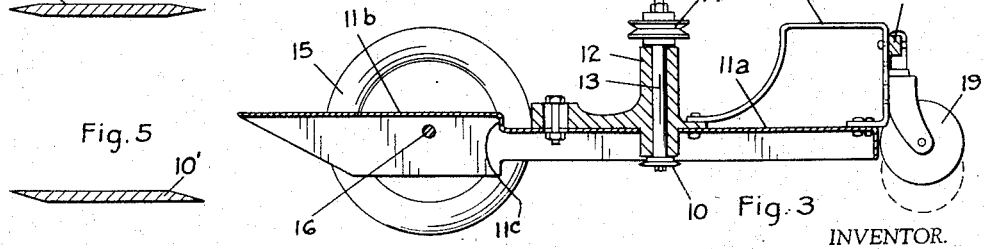
INVENTOR.
Ray H. Hainke
BY
ATTORNEY.

Patented Jan. 12, 1943

2,308,076

UNITED STATES PATENT OFFICE 2,308,076

LAWN MOWER

Ray H. Hainke, Kensington, Kans.

Application July 15, 1940, Serial No. 345,595

3 Claims. (Cl. 56—25.4)

My invention relates to lawn mowers and especially to the lawn mowers which are especially adapted for cutting lawns of golf courses, parks, and cemeteries at a minimum of labor, cost, and time.

An important object is the provision of a lawn mower which is adapted to trim lawns having tomb stones, monuments, fences, and other obstructions, the mower being especially adapted for working in close proximity to the obstruction without injury to either the lawn or the mower or the obstruction.

Another object is the provision of a lawn mower which will trim the lawn up to a sidewalk, thereby eliminating the necessity of hand trim.

Another object is the provision of a manually propelled lawn mower having motor driven cutting mechanism.

Another object is the provision of a novel steering means for a wide-cut lawn mower, whereby the lawn mower may be readily steered to avoid the shrubbery of a park or the markers of a cemetery.

Having in view these objects and others which will be pointed out in the following description, I will now refer to the drawing, in which Figure 1 is a view in perspective of my lawn mower.

Figure 2 is a plan view showing the under side of my lawn mower.

Figure 3 is a median, longitudinal, sectional view of my lawn mower.

Figure 4 is a transverse sectional view showing one form of a knife employed in my lawn mower.

Figure 5 is a similar view of a knife of optional form which I may employ.

The knife 10 or the knife 10' is apertured at its mid-point for mounting horizontally for rotation at a very high speed. The cutting is done not by shearing as in the conventional lawn mower but rather by whipping due to the high speed of rotation. The knives are formed as shown in Figures 4 and 5 or in any other suitable form for reversal when a cutting edge becomes dulled and for easy removal and sharpening when both edges become dulled.

The frame 11 of the lawn mower is made of sheet steel and, as best shown in Figure 2, its outline in its forward portion being in the form of a partial circle terminating at its rear in convergent edges. All the edge portions of the frame, except the rear edge, are downturned so that when the frame is supported on the wheels, the lower edges of the downturned flanges will be slightly above the surface of the ground and the frame will enclose a portion of the lawn as bounded by the forward part 11a and the rear part of 11b of the frame. The rear portion 11b is raised to provide an exit of enlarged depth for the cut grass and to reinforce the frame at this point by reason of the shoulder 11c formed by raising portion 11b.

Precisely at the circular center of the frame portion 11a is a bearing 12 for the vertical shaft 13. This bearing is in the forward portion of a casting which is secured to the frame portion 11a to project above its upper surface. The shaft 13 is driven through the pulley 14 at its upper extremity and it is provided at its lower extremity with means for securing a knife 10 or 10' thereto. The length of the knife is substantially equal to the diameter of the circular portion 11a of the frame so that all portions of the enclosed grass will be subjected to the action of the knife. The mower is supported on four wheels as shown, the rear wheels 15 carrying most of the weight. These wheels 15 are journalled on the ends of a transverse shaft 16 which passes through the downturned flange of the rear frame part 11b. The wheels themselves may be of any suitable material but the preferred form is pneumatic or semi-pneumatic for preventing injury to lawn, shrubbery of lawns, or markers of various kinds.

At the front of the frame is a strap 17 which is secured at its forward extremity to the part 11a at the extreme forward point thereof. The rear end of the strap 17 is bolted or otherwise secured to the casting of which the bearing 12 is a part. The strap 17 is in the form indicated in Figure 3, the forward portion of the strap being vertical. A cross arm 18 is secured to the vertical portion of the strap 17, the forward portion being provided with a plurality of apertures for the reception of a bolt for securing a cross arm 18 at any of several heights relative to the frame of the mower. The end portions of the cross arm 18 are downturned for the attachment thereto of a pair of castor wheels 19. This provides great flexibility for steering, especially around obstructions so that the mower will cut the grass at any point in the lawn which may come into contact with the outline of the part 11a of the frame.

The implement is designed to be manually propelled and steered, the operator walking behind and pushing the implement and also steering it. The structure for making the propulsion convenient is similar to that of other manually propelled implements so that it need not be explained in detail. This consists largely of two converging numbers 20 as shown best in Figure 1, these members terminating in any suitable handle. The members 20 are designed to be secured in the arms 21 which project from the collar 22 surrounding the shaft 16. While the propulsion is manual, the operation of the knife is accomplished by a suitable motor 23 having a suitable belt connection 24 with the pulley 14. Since the only function of the motor 23 is to operate the cutting knife, a small motor is amply able to drive the shaft 13 with the knife at a very high rate of speed to cut grass and weeds. The motor 23 rests on the portion 11b of the frame, this being slightly raised above the portion 11a. The center of mass of the motor is slightly forward of the wheel support 15 and the overhanging portion of the motor rests on the rear portion of the casting which carries the shaft bearing 12.

The importance of the downturned flange of the frame 11 will readily be apparent. As shown in Figure 2 the flange is continuous up to the mouth of the funnel formed by portion 11b. All parts of the flange are only slightly above the surface of the ground. It would therefore be almost impossible to carelessly get the fingers into contact with the knife 10. The main function of the downturned flange is, however, its effect on the air currents. The knife 10 rotates at a very high speed and not only cuts the grass but it sets up powerful air currents underneath the portion 11a. These currents are centrifugal and they are ejected tangentially through the rear portion 11b of the frame which thus acts as a funnel. The result is that the grass is not only severed at a point above the roots but the cut grass is subjected to repeated contact with the knife so that when the grass passes out through the rear of the funnel it is in very finely divided form. A suitable grass catcher may be secured to the funnel to catch all of the clippings but this should be in the form of a trailing bag due to the blast of air which ejects the clippings. The operator propels the implement by hand and he straddles the grass catcher while pushing the implement forward.

Having thus described my invention in such full, clear, and exact terms that its construction and operation will be readily understood by others skilled in the art to which it pertains, what I claim as new and desire to secure by Letters Patent of the United States is:

1. In a wheel mounted mower of the type having a horizontally rotating cutting blade and a motor for driving the same, a platform of material of substantially uniform thickness throughout, said platform comprising a relatively flat front portion having the outline of a partial circle and a relatively flat rear portion elevated with respect to said front portion, said platform further comprising a shoulder integrally joining said front and rear portions and acting to reinforce said platform, a downwardly extending flange extending around the entire edge of both portions of said platform except at the rear of said rear portion to form a circular compartment of one depth and a discharge compartment of greater depth, said circular compartment being adapted to receive said rotating blade, and to enclose the same at its top and sides, and the discharge compartment acting not only to receive the grass severed by said blade in said circular compartment but also to form a rigid platform for supporting said mower.

2. In a wheel-mounted mower of the type having a horizontally rotating cutter blade and a motor for driving the same, a circular blade housing having a rearwardly extending chute, the top of said chute being flat and elevated in relation to the top of the housing and joined thereto by an integrally formed shoulder, said housing being provided with a depending wall, said wall extending rearwardly and being enlarged in width to form a wall for the chute, said chute being adapted to provide a motor mount and a discharge compartment.

3. In a wheel-mounted mower of the type having a horizontally rotating cutter blade, a support for the wheels and a motor for driving the blade, a platform consisting of a drum-like housing, the lower portion thereof being open and adapted to receive a cutting blade, a chute extending rearwardly therefrom, the top of said chute being flat and disposed at a higher elevation than the top of the housing and being integrally joined therewith, the side walls of the housing extending rearwardly to form side walls of the chute, and means for receiving the wheel support in the side walls of said chute.

RAY H. HAINKE.